April 23, 1929.　　C. C. FARMER　　1,709,905
FEED VALVE DEVICE
Filed Nov. 30, 1926
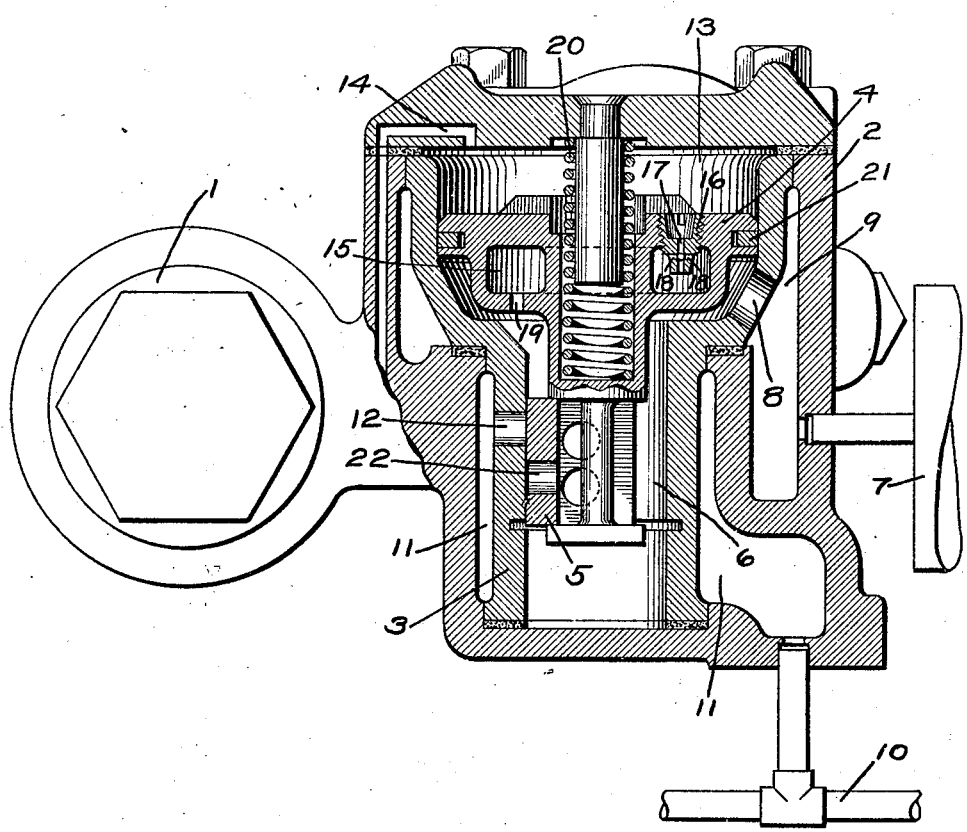
INVENTOR
CLYDE C. FARMER
BY *Wm. M. Cady*
ATTORNEY Patented Apr. 23, 1929.

1,709,905

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FEED-VALVE DEVICE.

Application filed November 30, 1926. Serial No. 151,695.

This invention relates to feed valve devices, and more particularly to a feed valve device of the type employed to supply fluid under pressure from the main reservoir to the brake pipe of a fluid pressure brake system.

The feed valve device of the type employed with fluid pressure brake systems comprises a supply valve for controlling the supply of fluid under pressure from the main reservoir to the brake pipe, a piston for operating said valve, and a regulating portion governed by the pressure in the brake pipe for controlling the fluid pressure on one side of said piston.

When the regulating valve of the regulating portion is closed, fluid under pressure equalizes through a restricted port from one side of the piston to the opposite side, permitting a spring to shift the piston and the supply valve to normal closed position.

It has heretofore been proposed to provide a restricted port through the piston to permit equalization of fluid pressures on opposite sides of the piston, but this port being necessarily small, there is danger that the port may become clogged with oil or foreign matter.

The principal object of my invention is to provide means for permitting a restricted flow from one side of the piston to the opposite side, in which danger of clogging is obviated.

In the accompanying drawing; the single figure is a view, partly in section, of a feed valve device embodying my invention.

As shown in the drawing, the feed valve device may comprise a regulating portion 1 and a supply portion 2. The supply portion may comprise a casing containing a bushing 3 within which is mounted a piston 4 and a slide valve 5 adapted to be operated by piston 4.

The valve chamber 6 at one side of piston 4 is connected to the main reservoir 7 through an opening 8 in the bushing 3 which leads to a chamber 9, said chamber being connected to the main reservoir. The brake pipe 10 is connected to a chamber 11 having a port 12 leading to the seat of slide valve 5.

The piston chamber 13 is connected through a passage 14 with the regulating portion 1.

According to my invention, the piston 4 is provided with an annular chamber 15 and a removable screw plug 16 is screwed into a threaded opening through the piston, said plug being provided with a restricted port 17 and a plurality of radial ports 18 which extend from the port 16 and open to the chamber 15.

At a point as far removed as possible from the plug 16, a port 19 is provided which connects chamber 15 with valve chamber 6. The piston 4 is subject to the pressure of a coil spring 20 and said piston is provided with a piston packing ring 21, to prevent leakage of fluid around the piston.

In operation, when the brake pipe pressure falls below the pressure at which the regulating portion 1 is adjusted, said regulating portion operates in the usual manner to vent fluid from the piston chamber 13 through passage 14. The piston 4 is then operated by the fluid pressure in valve chamber 6 so as to shift the slide valve 5 and cause port 22 to register with port 12. Fluid under pressure is then supplied from valve chamber 6 and the main reservoir 7 to the brake pipe.

When the brake pipe pressure has been increased by flow from the main reservoir to the predetermined degree for which the regulating portion may be adjusted, the regulating portion operates to cut off the venting of fluid from piston chamber 13. Fluid under pressure then equalizes from valve chamber 6 through the restricted port 17 into the piston chamber 13, permitting the spring 20 to return the piston 4 and slide valve 5 to the normal closed position.

It will be noted that fluid flowing from valve chamber 6 to piston chamber 13 must pass through the port 19 and then around through the annular chamber to the plug 16 and as a result, the walls of the chamber act as a baffle to prevent oil and foreign matter from passing with the fluid to the plug 16. Furthermore, should any foreign matter get to the plug, even should some of the restricted passages in the plug become clogged, so long as only one of the passages remains open, the desired flow of fluid from the valve chamber 6 to the piston chamber 13 will not be interfered with. Oil and foreign matter will collect in the chamber 15 away from the plug 16 and will not interfere with the flow of fluid.

Having now described my invention, what I claim as new and desire to secure by Letters Patent, is:—

1. A feed valve device comprising a supply valve and a piston for operating said valve, said piston having a chamber in the form of an annulus provided with an opening leading to the chamber at one side of said piston and having a restricted port leading from the chamber in the piston to the chamber at the opposite side of the piston, said opening being disposed at a point remote from said restricted port.

2. A feed valve device comprising a supply valve, a piston for operating said valve, said piston having a chamber in the form of an annulus and provided with an opening leading to the chamber at one side of said piston, and a removable plug in said piston having a central restricted port connecting the chamber within the piston with the chamber at the opposite side of the piston, said plug having radial ports connected to said central port and opening to the annulus chamber within the piston, and said opening from the chamber within the piston being disposed at a point remote from said restricted port.

In testimony whereof I have hereunto set my hand.

CLYDE C. FARMER.